United States Patent
Kim

(10) Patent No.: US 10,999,425 B2
(45) Date of Patent: May 4, 2021

(54) TERMINAL, SERVICE METHOD AND INTEGRATED IDENTIFIER MANAGEMENT SYSTEM FOR INTEGRATED IDENTIFIER AND USER INTERFACE

(71) Applicant: PAX S&T CO., LTD., Jeju-do (KR)

(72) Inventor: Jaedoo Kim, Gyeonggi-do (KR)

(73) Assignee: PAX S&T CO., LTD, Seogwipo-si (KR)

( * ) Notice: Subject to any disclaimer, the term of this patent is extended or adjusted under 35 U.S.C. 154(b) by 0 days.

(21) Appl. No.: 16/343,595

(22) PCT Filed: Dec. 21, 2018

(86) PCT No.: PCT/KR2018/016400
§ 371 (c)(1),
(2) Date: Apr. 19, 2019

(87) PCT Pub. No.: WO2019/132433
PCT Pub. Date: Jul. 4, 2019

(65) Prior Publication Data
US 2020/0145528 A1    May 7, 2020

(30) Foreign Application Priority Data

Dec. 27, 2017  (KR) .......... 10-2017-0180468
Feb. 8, 2018   (KR) .......... 10-2018-0015820

(51) Int. Cl.
*H04M 3/42*    (2006.01)
*H04M 1/27*    (2006.01)
(Continued)

(52) U.S. Cl.
CPC ... *H04M 1/72469* (2021.01); *H04M 1/27453* (2020.01)

(58) Field of Classification Search
CPC ........ G06Q 50/00; G06Q 10/10; G06Q 50/10; H04W 88/02; H04M 1/725; H04M 3/487;
(Continued)

(56) References Cited

U.S. PATENT DOCUMENTS

| 8,971,803 B2 * | 3/2015 | Dua ......................... H04B 5/02 455/41.1 |
| 9,247,070 B2 * | 1/2016 | Hession ................ H04M 7/006 |

(Continued)

FOREIGN PATENT DOCUMENTS

| JP | 2017528094 | 9/2017 |
| KR | 100836255 | 6/2008 |

(Continued)

*Primary Examiner* — Pablo N Tran

(57) ABSTRACT

A method of intuitively recognizing and using an integrated identification function by users by additionally displaying variable URI access menus on the existing user screen of the integrated identifier, and this is accomplished through an integrated identifier management system and a service method, which include: address servers for storing, managing and processing URIs (address) mapped to an integrated identifier and related information; a terminal for variably displaying a plurality of URI access menus on an integrated identifier user screen according to an address status (integrated identifier information, URI information, display information, and matching information) registered in the address servers; and a process for processing an integrated identification service through communication between the terminal and the address servers.

7 Claims, 15 Drawing Sheets

(51) Int. Cl.
*H04W 4/12* (2009.01)
*H04L 12/58* (2006.01)
*G06Q 50/00* (2012.01)
*G06Q 50/32* (2012.01)
*H04M 1/72469* (2021.01)
*H04M 1/27453* (2020.01)

(58) Field of Classification Search
CPC ......... H04M 1/72522; H04M 1/72583; H04M 3/42093; H04M 1/27453; H04M 3/42119; H04M 3/4931; H04M 2203/354; H04M 2203/252; H04M 2201/42
See application file for complete search history.

(56) References Cited

U.S. PATENT DOCUMENTS

| | | | | |
|---|---|---|---|---|
| 9,531,803 | B2* | 12/2016 | Chen | G06Q 10/10 |
| 10,129,386 | B1* | 11/2018 | Liu | G06F 40/134 |
| 2010/0035591 | A1 | 2/2010 | Park | |
| 2010/0076879 | A1* | 3/2010 | Mo | H04L 67/14 |
| | | | | 705/34 |
| 2014/0297403 | A1* | 10/2014 | Parsons | G06Q 10/00 |
| | | | | 705/14.49 |
| 2015/0227633 | A1 | 8/2015 | Shapira | |
| 2016/0055215 | A1* | 2/2016 | Kauwe | G06F 16/284 |
| | | | | 707/722 |
| 2017/0013135 | A1* | 1/2017 | Alexander | H04L 67/22 |
| 2017/0039291 | A1 | 2/2017 | Singh et al. | |
| 2017/0235464 | A1 | 8/2017 | Ben-Tzur | |
| 2019/0228351 | A1* | 7/2019 | Simpson | G06Q 10/025 |

FOREIGN PATENT DOCUMENTS

| | | |
|---|---|---|
| KR | 20090107852 | 10/2009 |
| KR | 20130049225 | 5/2013 |
| KR | 20130049267 | 5/2013 |
| KR | 20170072620 | 6/2017 |
| KR | 201764133 | 8/2017 |
| KR | 101780636 | 9/2017 |
| WO | WO2012095956 | 7/2012 |
| WO | WO2015057589 | 4/2015 |

\* cited by examiner

TERMINAL, SERVICE METHOD AND INTEGRATED IDENTIFIER MANAGEMENT SYSTEM FOR INTEGRATED IDENTIFIER AND USER INTERFACE

BACKGROUND

The present invention relates to a terminal, a service method, and an integrated identifier management system, which integrate various types of address and resource identifier under an integrated identifier as meaningful configuration, allow a single user interface (UI) to easily initiate access to services and function resources different from each other, and, in addition, find and integrally identify an optimal access counterpart. The address or identifier is a basis for interconnecting person to person, person to thing and thing to thing, for using a service and function resources such as a camera of a terminal and the like, and for providing information.

More specifically, the present invention relates to a terminal, a service method, and an integrated identifier management system, which integrate all forms and types of uniform resource identifiers (URIs) or addresses by mapping them under a phone number or a specific service identifier, and display the URIs or addresses on an existing phone call screen or a specific service screen as access menus so that a user may easily move to a service interface or a function resource interface supporting URIs (addresses) of different types and attributes and use subsequent processes.

In addition, the present invention relates to a solution which allows a calling user to simply initiate access to all addresses, services and function resources provided by a receiving counterpart by using only a service identifier such as a phone number or an e-mail address, which are general identifiers, and a receiver (a phone number owner or a service provider) to provide best services and responses by integrating all conventional complicated addresses or use methods under his or her phone number or a single service identifier without the need of informing the addresses and use methods to a calling counterpart, editing and setting the addresses and use methods in a desired form, and simply displaying them on a caller terminal, and in addition, an optimal counterpart may be identified by enabling best matching between the caller and the receiver on the basis of static and dynamic information associated under a phone number or a service identifier.

Addresses for communication and service/information access between human beings have been specifically divided starting from most fundamental geographical addresses, ranging from phone numbers to various Internet service addresses, owing to advancement in information communication. Accordingly, with all the conveniences provided by new services, inconvenience in using the services also has been increased due to multiple addresses and service systems. In addition, since addresses and interfaces of a new form are expected to appear owing to development of new techniques and services, simplifying the problem of complicated access and use of the addresses and the interfaces has become an important task of the IT industry.

Various attempts and efforts have been made to solve the problems, and a representative one is telephone number mapping (ENUM) appeared by an effort led by Internet Engineering Task Force (IETF). The ENUM is defined as a technique or a rule (protocol) for converting an E.164 address, which is a general public network international call identification number, into a string of a phone, e-mail, facsimile or homepage address. The ENUM converts an E.164 number into an Internet identification system (address) by utilizing a domain name server (DNS), and in order to use the ENUM, an official procedure, such as application and registration of E.164 number as an Internet domain name, should be performed, and a separate client or terminal capable of identifying the ENUM is required.

The most important function of an address/URI is an identification function, and seeing the address/URI, anybody may intuitively know, without explanation, a service type provided by the address/URI and a method of inputting the address/URI and using the service. In addition, since a phone number is an identifier for general phone call, a prior explanation is not needed for the communication counterpart. However, in the case of a phone number for ENUM, a counterpart does not know and cannot use the phone number for ENUM if an ENUM subscriber does not inform the phone number (that this phone number is an ENUM number) in advance and explain how to use it (explain about a terminal or application type to be installed, and how to use it).

After the appearance of the ENUM, attempts such as a method of assigning a service identification code that can be inputted together with a phone number by an ENUM client, a method of providing a fixed menu tree by a terminal, and the like have been made to solve the identification problem that the ENUM has. These methods need a precondition that a phone number and a mapping address respectively corresponding to an assigned identification code and a menu that is set in the terminal should always exist in an ENUM server. However, since the precondition does not match a realistic behavior pattern of users, these methods do not solve difficult problems such as "Does this phone number have a feature of an integrated identifier for ENUM?" or "Are the service identifiers under the phone number displayed on the terminal valid identifiers?". In addition, a frequently changed phone number cannot provide stability as an address by the nature of the address regarding stability of an identifier as the most important thing. Accordingly, with all the good intention of an integrated address/identifier, the ENUM is interrupted at the trial stage, and an actual application case is not specially reported until present.

Meanwhile, when a certain service or function resource is used in a wired or wireless communication network, a provider or a user provides or uses the service or the function resource through a different address/URI and interface. Accordingly, there is a disadvantage in that whenever the user desires to access a service or a function resource that the user wants to use, the user first finds out who possesses the service or the function resource that the user wants to use, acquires the address/URI of the service or the function resource that the counterpart possesses or allows to access, and finds an appropriate terminal, application and interface.

In addition, the service provider may not integrate and provide a service contact point to a calling user in a form desired by the service provider and should communicate with the user through a distributed service platform (e.g., phone, e-mail, homepage, blog, Facebook, telegram, Instagram, etc.) and a contact point.

Meanwhile, an address book, an address book sharing function, and some address sharing applications presently provided by smart phones merely share specific address items set in advance in a terminal, such as a phone, a homepage, an e-mail, a messenger account and the like, which are the most basic upper URIs, in a way of simply listing the items. In addition, a receiver should disclose addresses to be accessed and it is difficult to provide protection and access control of the address information, and there is a limit in the meaningful configuration of a form desired by a caller or a receiver (address owner) and in the convenience of access. That is, since the address items are restricted by the advance setting of the terminal, the address items are configured in a rigid structure in which it is difficult for the address owner to display the address items on a caller terminal in a variety of forms through self-setting.

SUMMARY OF THE INVENTION

An object of the present invention is to provide a terminal, a service method and an integrated identifier management system, which can integrate all types of addresses (URIs) currently existing and to be appeared in the future by mapping the addresses under a single phone number and initiate a related service interface on a phone call screen, by utilizing a phone number and a communication mode screen, without requesting a particular change in a user interface or a service use method that is already familiarly used by users.

In addition, an object of the present invention is to provide a service method and an integrated identifier management system, which edit and set URIs and related information of all resources desired to be used when a service provider communicates with a consumer or a trading partner in a desired name, a desired arrangement form, and a desired access control state from the viewpoint of the service provider, link the URIs and related information to a single integrated identifier called as a phone number, and display them on a user terminal.

In addition, an object of the present invention is to provide a service method, which finds and matches an optimal counterpart without the need of searching for the counterpart through other search sites or search methods, by managing static/dynamic information which reflects the attributes and needs of a phone number owner under a phone number used as an integrated identifier.

In addition, an object of the present invention is to provide a service method, which utilizes an e-mail or homepage address or an SNS account used as a general identifier, other than the phone number, as a single integrated identifier by simply extending the method described above, and displays URI access menus mapped under the integrated identifier on the same interface, so that users may easily move to another service interface by utilizing the access menu and use a corresponding service.

Analyzing and describing the problems to be solved by the present invention in more detail, a phone number is a general URI that everyone on the earth has, which is most conveniently and frequently transferred and used. However, since the phone number is expressed as a numeric string that is difficult to recognize using an identifier other than an address for a phone call (voice call, text message or video call) and an owner thereof is frequently changed, the phone number is inadequate to be used as a stable integrated identifier.

Therefore, a terminal, a service method and an integrated identifier management system which can solve the problems described below should be provided to use a phone number as an integrated identifier (the same solution of the problems is needed when another type of identifier is used as the integrated identifier).

First, it should be possible for the users to distinguish whether a specific phone number is an integrated identifier including other service connections provided through a URI other than the phone number without any prior explanation.

Second, although it is recognized that a specific phone number is an integrated identifier, which URI or service resources are mapped under the phone number should be identified before use.

Third, when a change occurs in the phone number, which is an integrated identifier, URIs and information mapped to the phone number should be immediately transferred to another phone number or a new phone number of the owner without interruption.

Fourth, when a specific phone number stops the role as an integrated identifier or the owner or the URIs mapped to the phone number are changed, information on the change should be immediately provided in a form that can be distinguished by the user to guarantee valid connection and services.

Fifth, it should not be a method of requesting a change in the behavior of the most generally and conveniently used existing telephone use method or various service use methods already familiarly used by users. In other words, a method of naturally melting in by using a display method that can be intuitively used should be presented almost without changing the way it is used.

Such a problem cannot be solved by the ENUM method which cannot cope with a change in the phone number since a separate client is used and the phone number is utilized as an Internet domain name, by a method of substituting a fixed service identification code (number) for a URI, or by an existing address book method used in the form of a fixed menu that is set in advance by a terminal.

It is since that in the real world, all users are not necessarily a subscriber of the integrated identification service, and although a user subscribes the service, each user maps different URIs to the phone number, and join and withdrawal of the service, change of the phone number, and change in the mapped address frequently occur.

Accordingly, an object of the present invention is to provide a terminal, a service method and a system, which is flexible as to provide an integrated identifier and a user interface capable of responding to unpredictable and variable behaviors of service users occurring in the real world.

The objects of the present invention are not limited to the objects mentioned above, and various problems can be solved by utilizing the terminal, the service method and the system of the present invention, and this will be more clearly understood from the description or embodiments described below.

The essential factor for solving the problems of the present invention is displaying addresses (URIs), desired to be mapped, on a current user interface screen unique to an integrated identifier without configuring a new service user interface such as a separate client of ENUM, abstracting an address into a composite form of text, image or text and image, and displaying the address in the form of a simple access menu, not displaying the address as is. Display or setting of an access menu is not restricted or fixed by the terminal, and an access menu and related information are unlimitedly and variably displayed on the terminal according to preset information of address servers, and access control is possible.

The above features can be implemented in detail through the terminal, the service method and the system described below.

The present invention provides an integrated identifier management system including: address servers for storing, managing and processing user's basic information, integrated identifier information, mapping URI information, display information and other attribute and setting information; a terminal for additionally displaying a plurality URI access menus and related information, in addition to display of existing addresses or access menus, on a current user interface screen unique to the integrated identifier according to information transferred from the address servers; and a service handling process for displaying latest address mapping information and related information on a service screen of the terminal through communication between the address servers and the terminal, and initiating a service interface corresponding to a URI access menu according to selection of the user.

The integrated identifier management system maps a plurality of URIs under an integrated identifier using one among the identifiers including a phone number, an e-mail address, a homepage address and an SNS account as a single integrated identifier and initiates the URIs in a single interface.

The phone number may be a virtual phone number or a non-uniform numeric string, in addition to a phone number of a general wired or wireless phone.

The address servers includes: an address management server for storing, managing and processing subscriber's basic information, integrated identifier information, address information, display information, matching information and additional attribute information and setting information; and an address mapping server positioned under the address management server to manage a mapping address by the type of each integrated identifier.

The address servers may further include an address matching server for extracting and providing an optimal matching counterpart address list on the basis of matching information, attribute information and setting information of the address management server and search and log information of the address mapping server.

The matching information of the address management server may include static information such as a job, a company, an identification, an address and the like of a registrant, dynamic information such as purchase, movement, trading, current location and the like showing normal activities, and log information showing a service access form.

The matching information may include dynamic information and log information of a general user using an integrated identifier according to the present invention, regardless of user's subscribing the service of the present invention.

When the system is configured only for the purpose of integrally identifying a plurality of URIs, the address server may omit the matching function and the address matching server.

The address servers may be linked to related external servers through an open API and used for various applications through exchange of information with each other.

The user interface screen unique to the integrated identifier may be a current contact information (address book) screen or a current call preparation screen (or a dial pad screen) of the terminal in the case of a phone number, and a current screen for providing a service in the case of an e-mail, a homepage or an SNS.

The terminal is a terminal capable of accessing at least one of wired and wireless communications and Internet and having a unique identification number, and the terminal includes a smart phone, a PC, a tablet PC, an AI speaker, a kiosk and a transportation means such as a vehicle, an electric kick board, a bicycle or the like.

An integrated identifier service method may be implemented in the terminal in the form of an application, and the application may display URI access menus and related information according to an address registration status registered in the address servers through communication with the address servers, and connect access to a service user interface or a service corresponding to a selected specific URI access menu.

In addition, the present invention provides a terminal comprising: a display unit, a voice output unit and a voice input unit, wherein a communication mode screen (contact information/address book screen or call preparation screen) of the display unit displays a plurality of URI access menus and related information according to an address mapping status and display information of the address server, and other attribute and setting information, in addition to (voice) call, video call and text message access menus.

A matching book (matching address book), which categorizes and displays addresses extracted and transferred by the address matching server, may be additionally displayed on the display unit.

In addition, the URI access menu includes at least one among the types of address or resource access menus, such as a phone number, a facsimile number, a webpage address, an e-mail address, a banking account, a messenger account, an SNS account, an image media channel, a vehicle/thing and a camera, and geographical address, and folding/unfolding and sharing of the URI access menus, shortcut to a wallpaper screen, and general editing and setting may be possible on the display unit.

In addition, in the display of the display unit, the voice call, video call and text message access menus, which are basic access menus of a phone number, may be partly removed, may change their names and may be arranged at different positions.

The present invention provides a service method comprising the steps of: receiving a specific integrated identifier and an address registration status mapped to the integrated identifier from an address mapping server, by a terminal; displaying URI access menus and related information corresponding to the integrated identifier and the address registration status transferred from the address mapping server on an integrated identifier user screen of a display unit of the terminal; selecting a specific integrated identifier and a specific URI access menu mapped under the specific integrated identifier from a user screen of the display unit of the terminal; and displaying a service user interface or a service page corresponding to the selected URI access menu on the terminal.

The URI access menu may include at least one among the types of address or resource access menus, such as a phone number, a facsimile number, a webpage address, an e-mail address, a banking account, a messenger account, an SNS account, an image media channel, a vehicle/thing and a camera, and geographical address, and it may be configured as a multi-layer menu, as well as a single layer.

The URI access menu may be a URI access menu which abstracts an address of all kinds ranging from an address of a lowest layer up to an address of a highest layer and individually configures independent services or configures part of an entire service.

The step of selecting a specific integrated identifier and a specific URI access menu at the display unit of the terminal can be performed by selecting a specific integrated identifier and a specific URI access menu in a method of recognizing a voice inputted through a voice input unit.

In addition, the service method of the terminal may selectively process exposure and non-exposure of an address according to setting of the address servers, and display different mapping URI access menus and information under the same integrated identifier according to counterpart, time and location information.

The step of selecting a specific integrated identifier and a specific URI access menu as an option at the display unit of the terminal may be accomplished in a method of launching services by simultaneously or sequentially selecting a plurality of specific URI access menus.

The related information displayed on the display unit of the terminal may include attribute information (a name, a company, a position, a logo and an image) of an integrated identifier registrant, an image or text expressing an attribute/name of a URI access menu, and a short announcement message or an advertisement/public relation message.

The present invention provides an address mapping server for storing and managing display information which defines information to be displayed on a terminal, search information and log information to be used for matching, and setting information for controlling a mapping address, in addition to storing general URIs (address) mapped to an integrated identifier.

The address mapping server may have the same server layer and a routing system corresponding in parallel to a layer structure and a routing system of a phone number or an identifier account management server which manages an existing phone number or service identifier used as an integrated identifier.

In the case of an address mapping server which manages a phone number as an integrated identifier, the address mapping server may have a wired and wireless communication network layer and a national or international routing layer structure for managing address mapping servers in a manner the same as that of a phone number routing layer structure.

The address mapping server may prevent hacking or secure validity of an address by adopting a distributed structure of a block chain form and storing address mapping information in terminals of users or distributed servers.

In addition, the present invention may provide a user interface for performing at least one among registration, deletion, change, activation and name change of URIs matching to registrant basic information, integrated identification account information, and URIs mapped to each account and registration, change and deletion of matching information, and also provide a user interface for displaying received notification information and matching status, in association with the address management server.

The user interface may be a URI access menu displayed at a portion of the display unit of the terminal, or an application, or a function key, or may be displayed as a specific name or icon.

According to the terminal, the service method and the system of the present invention, a caller may intuitively recognize and use an access menu on seeing the access menu additionally displayed under or around existing identifiers/addresses in an existing user screen without a special explanation or guidance.

Accordingly, in the present invention, even if a user knows only a phone number, the user may use services belonging to an Internet address system, such as access to various homepages, e-mail transmission and the like, in addition to voice/video call and text message transmission, on the screen of the same communication mode using a phone number in a communication mode (contact information/address book, call preparation screen/dial pad screen) of the display unit of the terminal such as a smart phone or the like. Furthermore, the present invention may easily initiate services related to a general service address system, such as banking, navigation combined with a general geographical address and the like. In addition, a user may easily access and use various convergence services implemented by a service provider through combination of URI access menus under the integrated identifier.

In addition, in the present invention, it is possible, in any service interface in which an address is used as an integrated identifier, to immediately shift to another service and access the same counterpart. For example, when an e-mail address is used as an integrated identifier, if a user knows only an e-mail address of a counterpart, it is possible for the user to access a phone number, a text message, a homepage, an SNS, banking account (for money transfer or payment) or the like displayed in an e-mail browser together with the e-mail address, and the phone call/text message or the like can be processed through a smart phone integrated with a e-mail browser in a PC by CTI although a call function is not provided in a PC.

Meanwhile, since the URI access menu displayed on the terminal of the present invention is not a menu set by the terminal and is variably displayed according to recent information registered in the address server by an owner/manager of the integrated identifier, the URI access menus are displayed by reflecting the latest status of the URI mapped at all times for each integrated identifier, and the callers may recognize the recent state of the URI desired to access in advance before accessing the URI.

In addition, a receiver (an address owner or a service provider) may transfer, configure and display URI items which are not limited by setting of the terminal. Accordingly, it is possible to freely set a URI menu display name of a desired form and related information such as a configuration, an array type, a real-time announcement and the like of the overall access menus and display them on the display unit of the caller terminal under an integrated identifier, and an optimum URI menu may be configured and transferred according to a counterpart, a place where the counterpart is, and a communication time/day/season.

As described above, since the present invention applies an open structure, not a closed structure by previous setting of the terminal or the system, URIs having different functions and resources may be combined and arranged to be used for creating new services or constructing effective job handling processes, and a user may find open resources scattered on the Internet and almost unlimitedly and arbitrarily utilize the resources to configure services, as well as displaying his or her resources as URI menus under an integrated identifier.

For example, a professor of a college may gather resources scattered here and there and configure the resources as URI menus such as introduction of a lecture, a lecture plan, lecture videos, reference data, submission of assignments, SNS of students participating in the lecture, a phone, a text message, and an e-mail under his or her phone number, and may transfer all the important things he or she wants to deliver to the students just by announcing his or her phone number in a way of writing down the phone number on the blackboard at the first hour of the lecture. After the students register the phone number of the processor in their address book, a simple announcement such as "A pop quiz is scheduled in the lecture on December 3rd" may be delivered to the students at the same time by displaying the message under a phone number window, and resources needed for the students may be delivered to the students at any time by modifying the URIs in a desired form under his or her phone number.

In addition, the present invention may easily handle registration, deletion and change of an integrated identifier by positioning an address mapping server, which manages changeable URIs or accounts as an integrated identifier, at a lower layer of the address management server managed by an invariant account.

Meanwhile, the URIs displayed under an integrated identifier are displayed as an identifier of a menu form, and a real address is not displayed, and since the address itself may be mask-processed according to setting even when the user moves to a corresponding service page and a service is initiated, it may be benevolently utilized by a receiver who does not want to expose the address but to be accessed.

In addition, since URIs having characteristics of various attributes and types may be deployed in an integrated form by infinitely combining the URIs using unit URIs and multiple/simultaneous starting URIs, integrated display of various address layers without distinguishing higher and lower layers, URI sharing function, CTI and the like, they may be used as a platform for configuring various services and transferring applications, and long or complicated sub-address resources, which are difficult to use in the prior art, may be used unlimitedly.

Particularly, a phone number simply used only for phone call or text transmission in the prior art is reborn as an identifier for accessing and transferring all information and services while it is easiest to access and use. At this point, since the phone number can be simply transferred and displayed through any medium (signboard, advertising board, site, media) regardless whether it is online or offline, if the phone number is able to map all forms of complicated and diverse URIs, accessibility and transferability of the information and services are enhanced as much as incomparable to those of the prior art.

In addition, transfer and installation of applications through mapping to a phone number are possible without using an existing App Store by means of the URI sharing function, display of a shortcut to the wallpaper screen or the like. A new distribution ecosystem may be created by installing personalized shared shopping malls under individual phone numbers, and a service ecosystem equal to the existing App market and download, installation and use of Apps may be created in association with external resources through the URI markets or open APIs.

In addition, as a secondary effect, it does not need to search for a counterpart on purpose from a search site, and an optimal counterpart may be found through a matching list that is automatically extracted by a matching server on the basis of matching information or attribute information, which has been inputted when an address is registered, and dynamic information.

---

DESCRIPTION OF SYMBOLS

Figure 1:
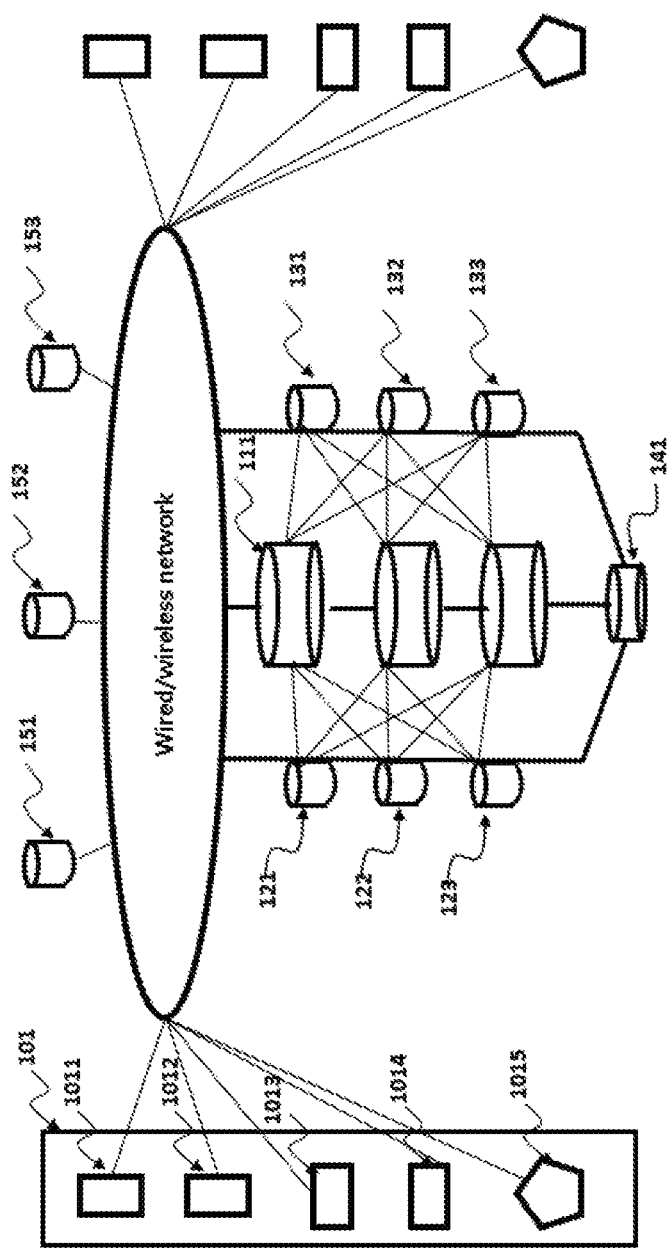
FIG. 1 is a view showing the concept of the entire configuration of an integrated identifier system according to the present invention.

101: Terminal
1011: Smart phone
1012: Tablet PC
1013: PC
1014: Vehicle
1015: AI speaker
111: Address management server
121, 122, 123: Phone number mapping server
131, 132, 133: E-mail/Homepage/SNS account mapping server
141: Address matching server
151, 152, 153: Service server
201: Housing of terminal
202: Display unit of terminal
203: Voice output unit of terminal
204: Voice input unit of terminal
205: First communication module of terminal
206: Second communication module of terminal
207: Control unit of terminal
300: Conventional terminal
500: Conventional e-mail screen
510: E-mail screen of the invention

---

DETAILED DESCRIPTION OF THE INVENTION

Those skilled in the art may easily embody the spirit of the present invention according to the detailed description described below. In describing the embodiments of the present invention, related known techniques will not be described here in detail unless it is required in describing the embodiments of the present invention.

Hereinafter, the preferred embodiments of the present invention which can specifically realize the above objects will be described in detail with reference to the accompanying drawings.

In describing the embodiments, when an element is disclosed as being formed "on or under" each element, "on or under" includes both directly contacting the two elements with each other and indirectly forming the element by disposing one or more elements between the two elements. In addition, when it is expressed as "on or under", it may include a downward direction, as well as an upward direction, from an element.

In addition, relational terms such as "first" and "second", "top/upper/above", "bottom/lower/under" and the like used below may be used solely to distinguish one substance or element from another substance or element without necessarily requiring or implying any physical or logical relation or order between the substances or elements. In addition, like reference numerals refer to the same elements throughout the description of drawings.

In addition, the terms such as "includes", "comprises" or "has" should be interpreted not to exclude other elements but to further include such other elements since the corresponding elements may be inherent unless mentioned otherwise. In addition, the term "corresponding" may include at least one among the meanings of "interacting" and "relating under a special rule".

In addition, from the aspect that in a strict sense, a banking account or a general geographical address, not an information resource identifier on an Internet network, may also be expressed on the Internet and subsequent services can be processed, the banking account and the general geographical address are expressed as URI in a unified way, and the URI and the address are interchangeably used.

FIG. 1 is a view showing the concept of the entire system configuration in which an integrated identifier of the present invention operates.

A terminal 101 of the present invention is a smart phone 1011, a tablet PC 1012, a PC 1013, a vehicle 1014, an AI speaker 1015, a terminal capable of performing a touching or clicking function such as an Internet phone, a PC soft phone, a PMP, a PDA or the like, or a terminal controlled by a voice command. In addition, the terminal 101 is capable of Internet access and particularly includes all terminals (including feature phones) located under (inside) a display unit, in which an application for processing a service user interface (UI) and a service access launcher is mounted. The terminals may be synchronized with or interconnected to each other when they belong to the same owner or manager.

The address servers which process services of the present invention have a configuration of an address management server 111, address mapping servers 121 to 123 and 131 to 133, and an address matching server 141. However, the servers are classified for conceptual understanding, and logically and physically, they may be integrated or partly omitted or separated without a limit according to implementation environments and conditions.

The address management server communicates with a terminal of an address registrant to store and manage basic information, integrated identifier information, address information, display information and attribute information of the registrant and place and manage the address mapping server at a lower level.

The address mapping server has a layer structure corresponding to a server which manages an integrated identifier account/subscriber (a phone number, an e-mail address, an SNS account, etc.) and communicates with a corresponding account management server to transfer URIs mapped to the identifier of the account/subscriber and related information and display the URIs and the information on a service screen, which is a user interface of the identifier. At this point, information on the address mapping server is updated on the basis of the information on the address management server.

The address matching server collects static information related to the attributes of a registrant registered in the address management server, dynamic information collected by the address mapping server, integrally analyzes the collected information and log information, matches and extracts addresses of best matching counterparts after integrally analyzing the collected information, and displays the addresses on the user terminal.

The address matching server may be omitted from the address server configuration if it does not provide a matching service.

If a user using the terminal according to the present invention selects on the display unit of the terminal a URI access menu under the integrated identifier displayed on the basis of the transferred information from the address mapping server, a service corresponding to each URI is accessed, or a UI is launched, and subsequence services are processed by the servers 151, 152 and 153 in charge of each service. Meanwhile, a unique application supporting the URI displayed on the terminal is included in an integrated identifier terminal application as a basic package to be automatically provided/installed, or each terminal user may install the application by himself/herself.

Figure 2:
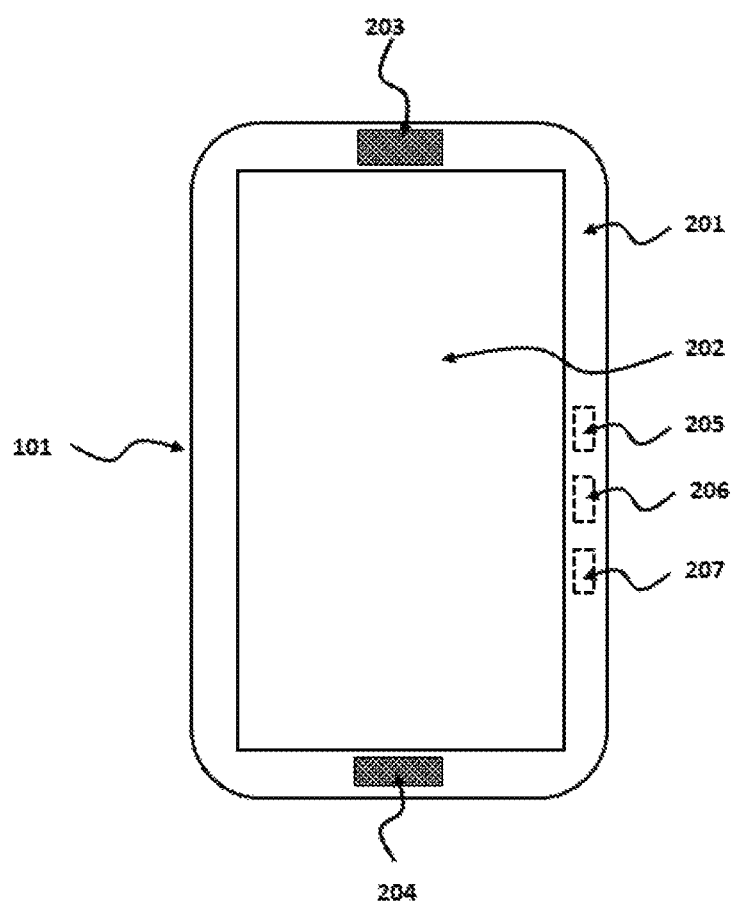
FIG. 2 is a view showing an example of a terminal, in which an integrated identifier service according to the present invention is implemented.

FIG. 2 is a view showing an example of a terminal, in which an integrated identifier service according to the present invention is implemented.

The terminal 100 according to the present invention may initiate various services such as access to the Internet on a contact point address book screen, a call preparation screen or each service screen in addition to voice call, video call and text message transfer, by mapping various URIs such as an e-mail address, a homepage address, a banking account number, an SNS account and the like, by means of a wired or wireless phone number or a service identifier stored or inputted in the terminal. At this point, the functions described above may be implemented through an application installed in each terminal.

The terminal 101 may be configured to include a housing 201, a display unit 202, a voice output unit 203, a voice input unit 204, a first communication module 205, a second communication module 206 and a control unit 207, as shown in FIG. 2.

The housing 201 may be a body for receiving various constituents of the terminal 101.

The display unit 202 may be a display unit of the terminal, may be an area for displaying a contact point address book screen, a call preparation screen or an e-mail screen described below, and may be an input unit where a user touches or clicks the terminal.

The voice output unit 203 may be a speaker of the terminal 101, and the voice input unit 204 may be a microphone of the terminal.

The first communication module 205, the second communication module 206 and the control unit 207 may be provided inside the housing not to be exposed to the outside, and in FIG. 2, they are shown as dotted lines.

The first communication module 205 transmits and receives signals for voice communication of the terminal 101 and may be a module which exchange signals with wired and wireless base stations.

The second communication module 206 may be a module which transmits and receives signals for Internet access or the like of the terminal 101. According to terminals, only the second communication module may be provided.

The control unit 207 may control operation of the constituents in the terminals 101. The shape and arrangement of the housing, the display unit and the constituents of the terminal may vary depending on terminal type.

Figure 3:
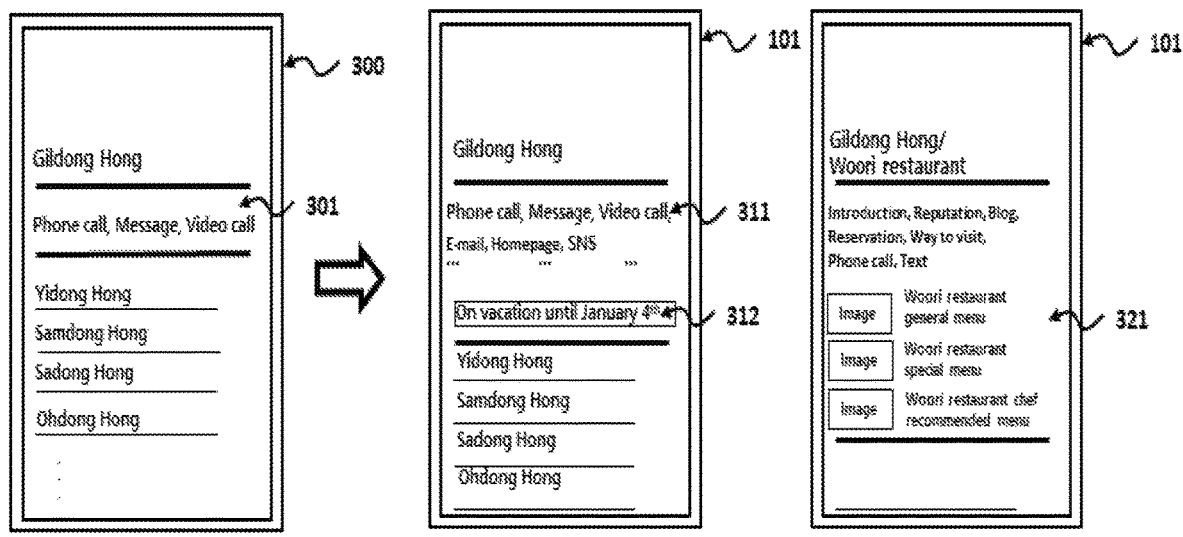
FIG. 3 is a view comparing an example of a contact point address book of a terminal according to the present invention with that of an existing terminal.

FIG. 3 is a view comparing an example of a contact point address book screen of a terminal according to an embodiment of the present invention with a conventional screen of a terminal. Here, the essential factor is that the screen according to the present invention does not configure a separate client or a separate screen like ENUM or the like, does not request a configuration or a use method completely different from the screen of an existing terminal, and adds only additional functions of a natural version-up style to an existing use screen, and thus, natural accommodation, intuitive identification and learning how to use it are possible. That is, a user screen of the present invention is always integrated with an existing user screen. This is equally applied to the call preparation screen shown in FIG. 4 or the e-mail screen shown in FIG. 5. Here, integration with an existing use screen means that although another terminal application is installed, it has a form integrated with an existing user screen from the aspect of screen or functionally. That is, it means that even in a terminal to which the present invention is applied, the functions shown in FIG. 3 can be additionally used while existing services are used in the existing method, on a screen the same as that one used in an existing terminal. Needless to say, an application of the same screen as that of a smart phone may be installed in a PC or a tablet PC for synchronization between the smart phone and the PC or the tablet PC. When the service according to the present invention becomes general, a separate service screen different from an existing service screen may be newly configured as a large upgrade is needed.

A plurality of URI access menus, in addition to a voice call menu, a video call menu and a text message menu 301 of the conventional terminal 300, may be displayed 311 in the display area of the address book according to a mapping address registration status (basic information, address information, display information) transferred from the phone number mapping server 121, 122 and 123. Here, although URI access menus divided into an e-mail access menu, a homepage access menu, a SNS access menu, a banking access menu and the like are displayed, it is not necessarily limited thereto, and the names of the URI access menus may also be freely set and displayed.

In addition, each access menu may have a multi-layer configuration including sub-access menus under the access menu. Practical URI information of each access menu and an application capable of launching a service UI corresponding to a URI or driving a service access exist under an access menu display area. In addition, a simple announcement message 312, in addition to the URI access menus, may be displayed in the display area, and according to display information setting of the address mapping server, an existing access menu and the URI access menu may be arranged in an arbitrary form that the service provider wants to display, and advertisement/public relation information which combines images and text may be displayed 321. As described above, the service provider may configure an access menu in a simple mapping form 311 in which each access menu has a character of independent service or may configure the access menu in a form 321 in which each access menu is an element of the entire service configuration.

Meanwhile, the contact point address book having a display area 311 as shown in FIG. 3 may be combined with an address book of a form like an e-mail address book, a friend list of an SNS, or the like to be implemented on an e-mail screen or an SNS service screen.

Figure 4:
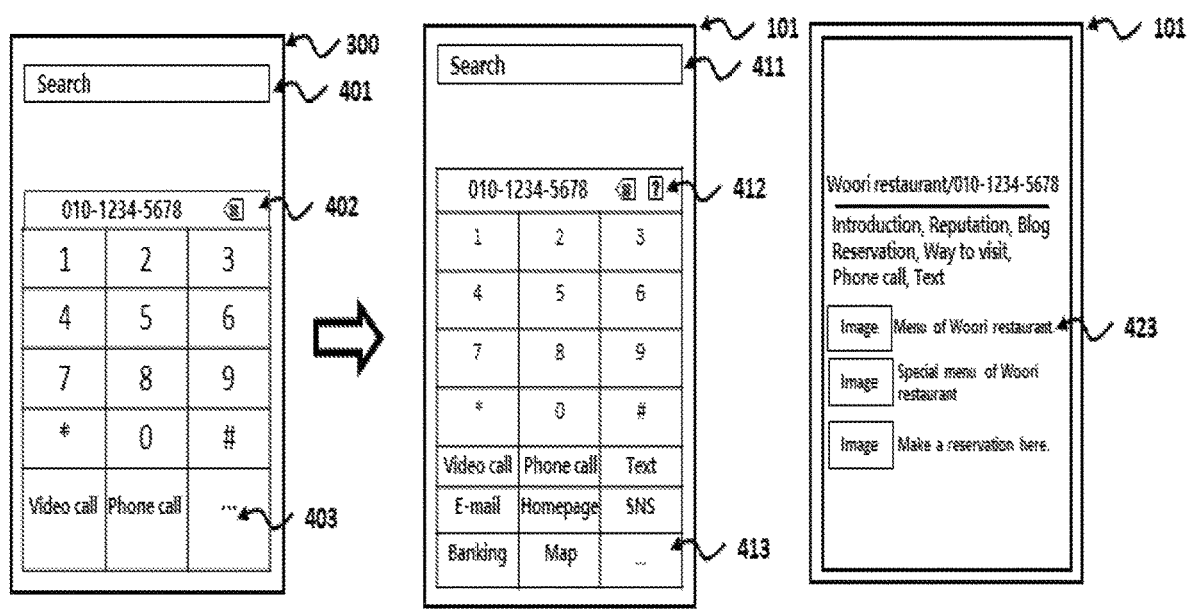
FIG. 4 is a view comparing an example of a call preparation screen of a terminal according to the present invention with that of an existing terminal.

FIG. 4 is a view comparing call preparation screens of an existing terminal 300 and the terminal 101 according to an embodiment of the present invention. A search window 401 and 411 and a phone number input window 401 and 412 are displayed on both of the two types of terminals. If a phone number is inputted in a phone number input window 402 and the phone call is selected from an access menu display unit 403 in the existing terminal 300, the user may make a voice communication. If the user touches the query button displayed on the phone number input window 412 after inputting a phone number at the terminal 101 of the present invention, a plurality of URI access menus is displayed on an access menu display unit 413 according to address (URI) and display information setting of the address mapping server, in addition to the voice call, video call and text message access menus. In addition, the URI access menus may be displayed in a different form 423 according to setting.

In the case of search, search of an existing terminal 300 is limited to phone numbers registered in the terminal or to the recently used phone numbers. However, the terminal 101 of the present invention searches for phone numbers from the address mapping server, in addition to the phone numbers stored inside the terminal, and displays the phone numbers on the call preparation screen (or a dial pad screen) or a separate screen, together with the basic information of the phone number owner and a plurality of mapping URI access menus. Various methods may be adopted according to screen configuration, in addition to a query button method, to call display of the URI access menus. In addition, the search may be divided into a general phone number search and an App mapping phone number by classifying the search button.

Figure 5:
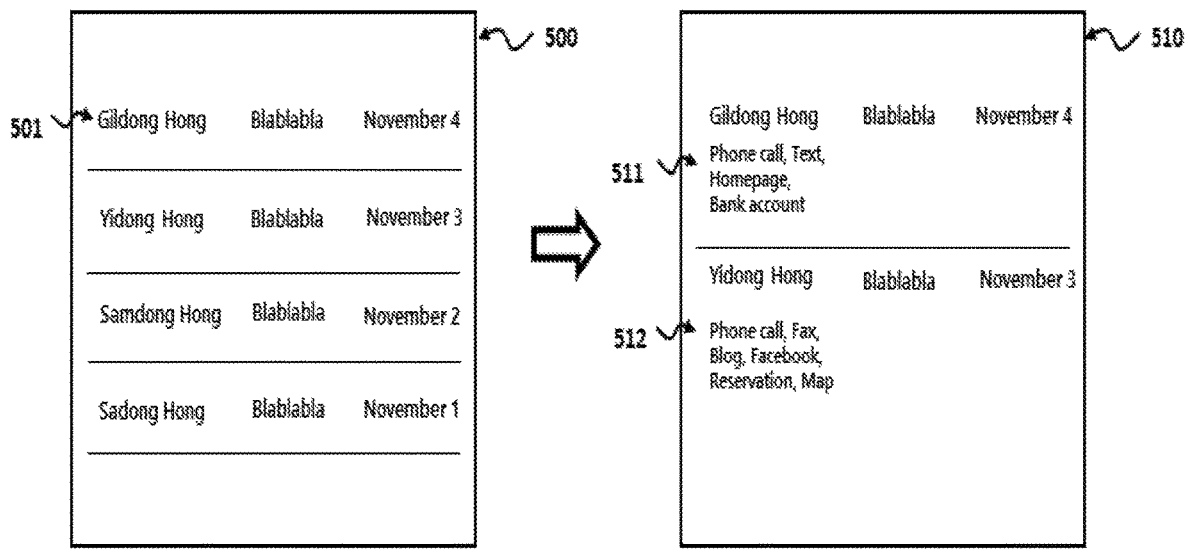
FIG. 5 is a view comparing an example of an e-mail screen according to the present invention with an existing e-mail screen.

FIG. 5 is a view comparing an existing e-mail service screen with an e-mail service screen according to an embodiment of the present invention.

In the case of an existing e-mail service screen 500, it is formed in an array 501 in which a counterpart, a brief title or content of an e-mail and a transmitting or receiving date are displayed.

In the e-mail service screen 510 according to an embodiment of the present invention, a plurality of URI access menus matching to an e-mail address of a corresponding counterpart may be displayed 511 and 512 on the display unit of the counterpart on the basis of information on the e-mail address mapping server 131. This figure shows only an example of a display method and is not limited thereto, and the URI access menus may be displayed in a variety of ways according to screen configuration of an e-mail browser. A user may process services such as a phone call, a facsimile, home page access and the like, in addition to transmission and reception of e-mails on the e-mail screen. If a CTI function is used when a terminal of a PC or the like does not provide a communication or text message service, the communication or text message service may be processed through synchronization with another terminal of the user.

Like this, mapped URI access menus are displayed on the screen of the display unit showing a homepage address in the case of a home page screen and on the screen of the display unit showing a counterpart in the case of an SNS account, and a service corresponding thereto may be initiated.

Figure 6:
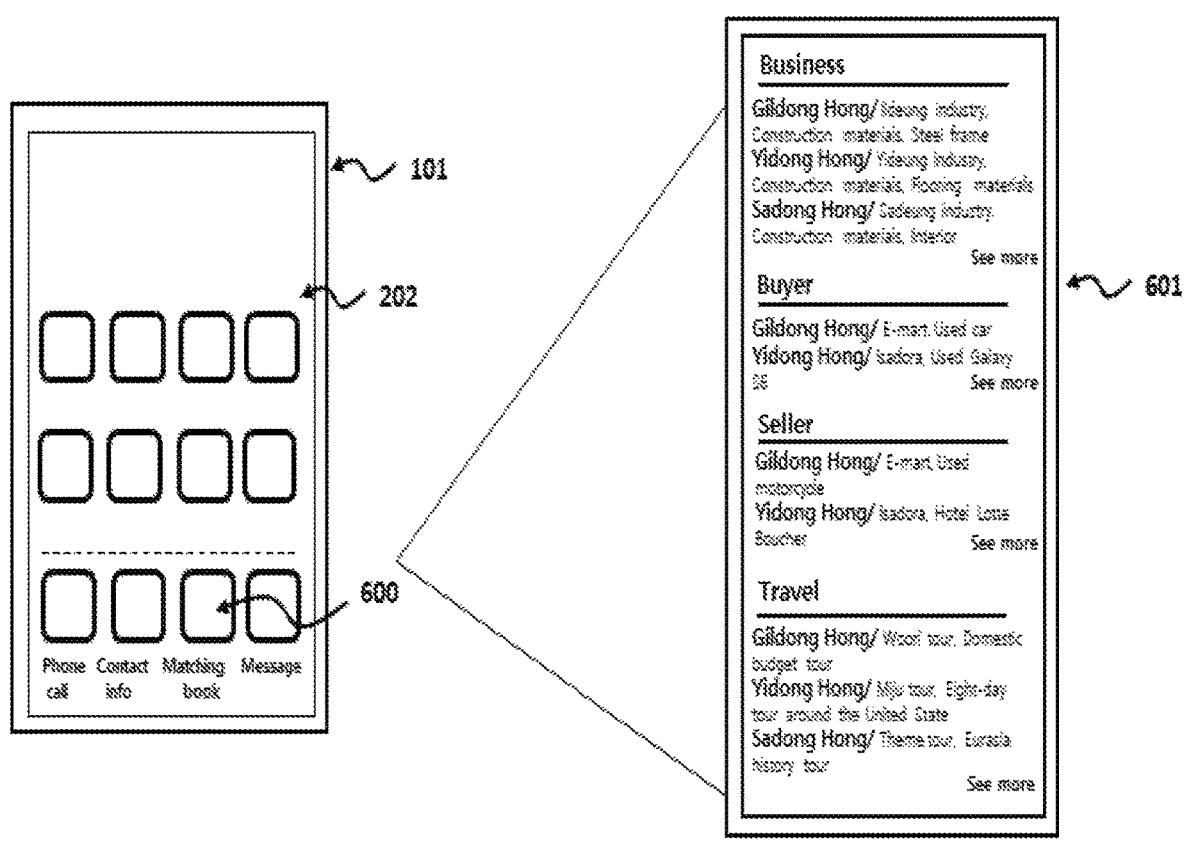
FIG. 6 is a view showing an example of a matching book (matching address book) according to the present invention.

FIG. 6 is a view showing an example of a matching book displayed on a display unit of a terminal by the address matching server of the present invention.

An icon of a matching book (matching address book) 600 may be displayed on the display unit 202 of the terminal 101, in addition to contact information, i.e., an existing address book. If the matching book 600 is touched, matching address information extracted and created by the address matching server 141 is displayed 601 by category, and a user may select an appropriate counterpart at the display unit and communicate with a desired counterpart using a URI access menu in a method like the contact point address book 311.

The mapping address book may also be displayed in the form of a list/menu, which is separate from an existing friend list or address book, even on an e-mail or SNS screen.

To display a plurality of URI access menus, in addition to an existing access menu or an address/URI of a counterpart, on the display unit of the terminal according to the present invention as described above, it needs to provide an address server for storing phone numbers or service identifiers—functioning as an integrated identifier and an e-mail or homepage address mapped to the phone numbers or the service identifiers, or storing a banking account number and various service addresses (URIs), and managing related information.

Figure 7:
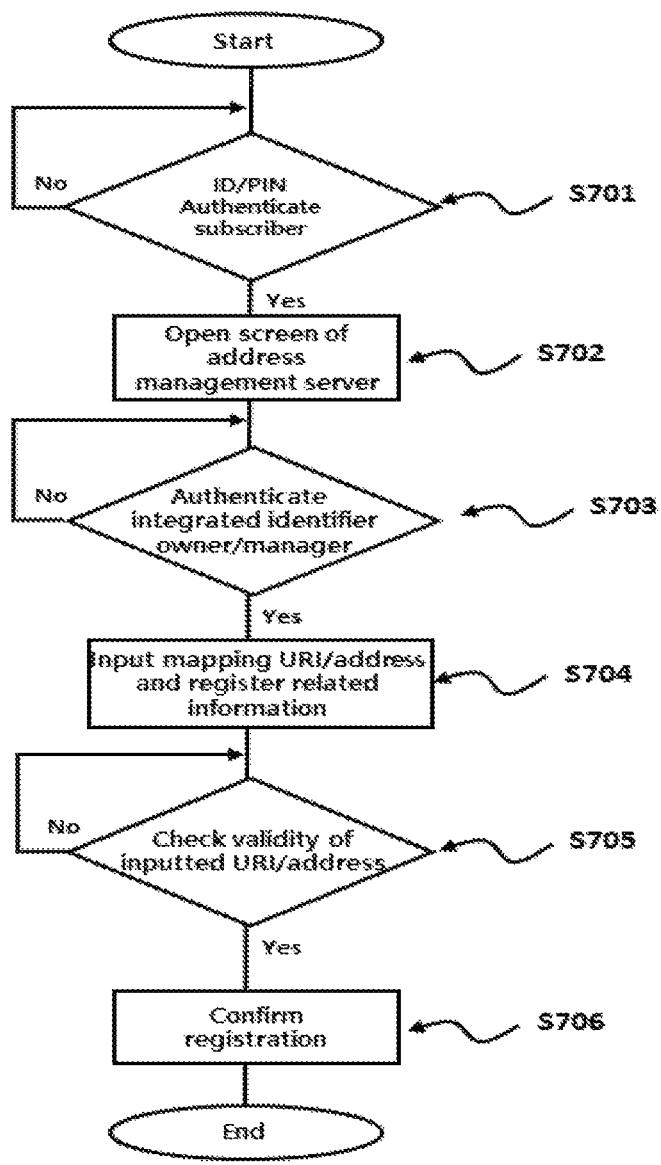
FIG. 7 is a flowchart illustrating an example of a procedure of registering an integrated identifier and an address (URI) according to the present invention.

FIG. 7 is a flowchart illustrating an example of a procedure of registering an integrated identifier and an address in the address management server.

A registered user may access an address management screen through an access UI of the address management server 111 displayed on the display unit 202, on a contact point address book screen, or on a call preparation screen of the terminal 101, in the form of a function key or an icon. The user may register addresses that the user desires to register on a screen provided by the address management server. First, it is determined whether a user having a valid right for registration accesses by performing a subscribe authentication process on a user who desires to register (S701). If the user does not have a valid right to register, the registration is refused, and if the user is a valid user, a registration screen of the address management server is opened (S702). If the user inputs a phone number, an e-mail address or a service identifier as an integrated identifier desired to be registered, the address management server authenticates whether the user is a valid owner or manager (S703). If the user is a valid manager, the user may register a corresponding phone number or identifier as an integrated identifier and may register addresses to be mapped under the integrated identifier, together with related edit information, setting information, and display information (S704). If service connection URIs or addresses are inputted, the address management server inspects validity of the inputted addresses (S705), and the address management server refuses registration if the addresses are invalid and allows registration of only valid addresses. If the user inputs valid addresses and finally confirms registration (S706), registration of the addresses is finished. If an important address like a banking account number is included when the addresses are registered, the above procedure may add a step of separately performing a special authentication procedure. The above procedure does not necessarily need to be performed with temporal continuity, and since it is a procedure for displaying the most fundamental authentication element of registration, it can be modified without a limit.

Figure 8:
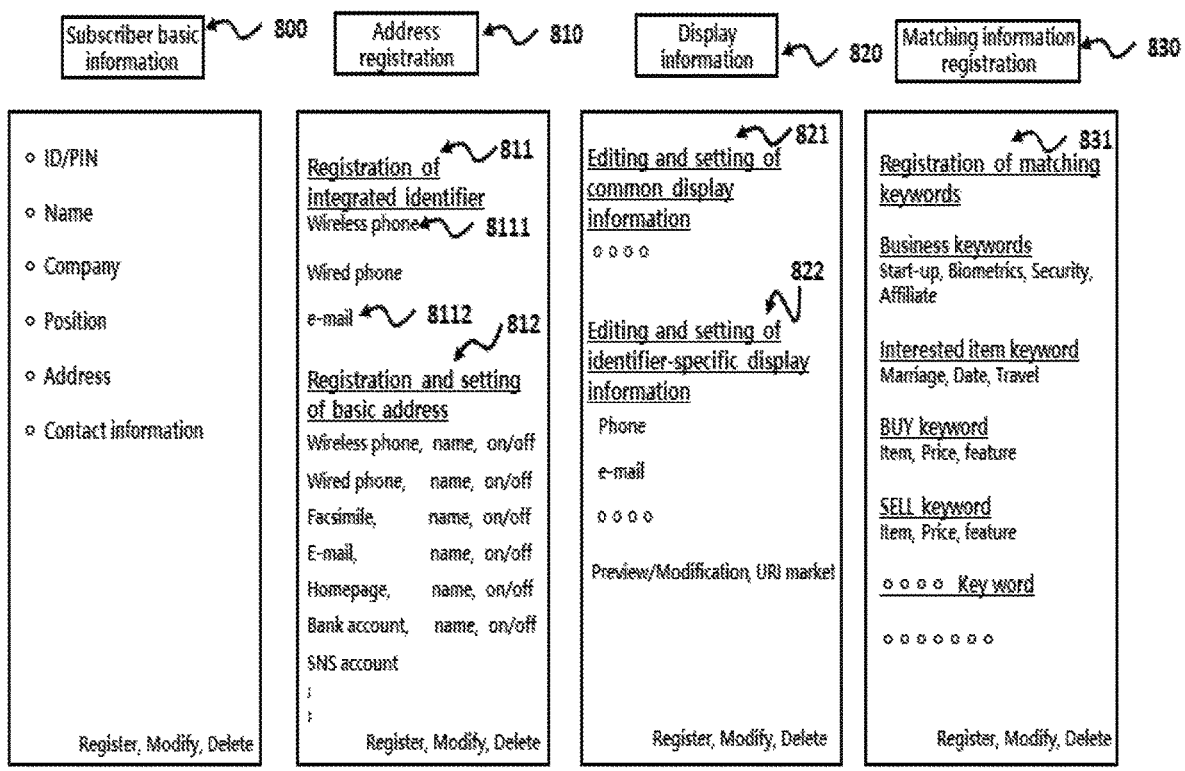
FIG. 8 is a view showing example screens of an address management server according to the present invention.

FIG. 8 is a view showing examples of management screen of the address management server.

Subscribers registered in the address management server have an invariant account, and subscriber information is registered and managed under the same account.

If a user having a valid access right accesses his or her address management screen, the user may access a screen capable of registering subscriber's basic information 800, address information 810, display information 820 and matching information 830. The user may register, modify and delete corresponding information on each screen according to the registration/input procedure of FIG. 7 and perform a work of editing or setting various information. It is possible on this screen to register and manage integrated identifiers 811, 8111 and 8112, register and set addresses 812, and edit and set various display information according to the integrated identifier, a counterpart, a location, a time or the like 821 and 822. In addition, a matching keyword may be registered 831 as basic information for searching for an optimal counterpart. In addition, the address management server provides a preview function for inspecting and modifying in advance a display form to be arranged on a counterpart terminal, provides a URI market where service resources which provide various functions and information can be found, and provides an integrated interface capable of performing editing and setting, such as registration, modification, deletion and the like, of various information on a service screen linked to a URI registered by a registrant. Furthermore, related information may be transmitted to a server of another service site through an open API to be utilized for updating an address or providing an integrated identification service. The screen of the address management server of FIG. 8 may be divided into a brief configuration for general users, a high-class configuration for premium users, and a high-level configuration for providing high level services.

Figure 9:
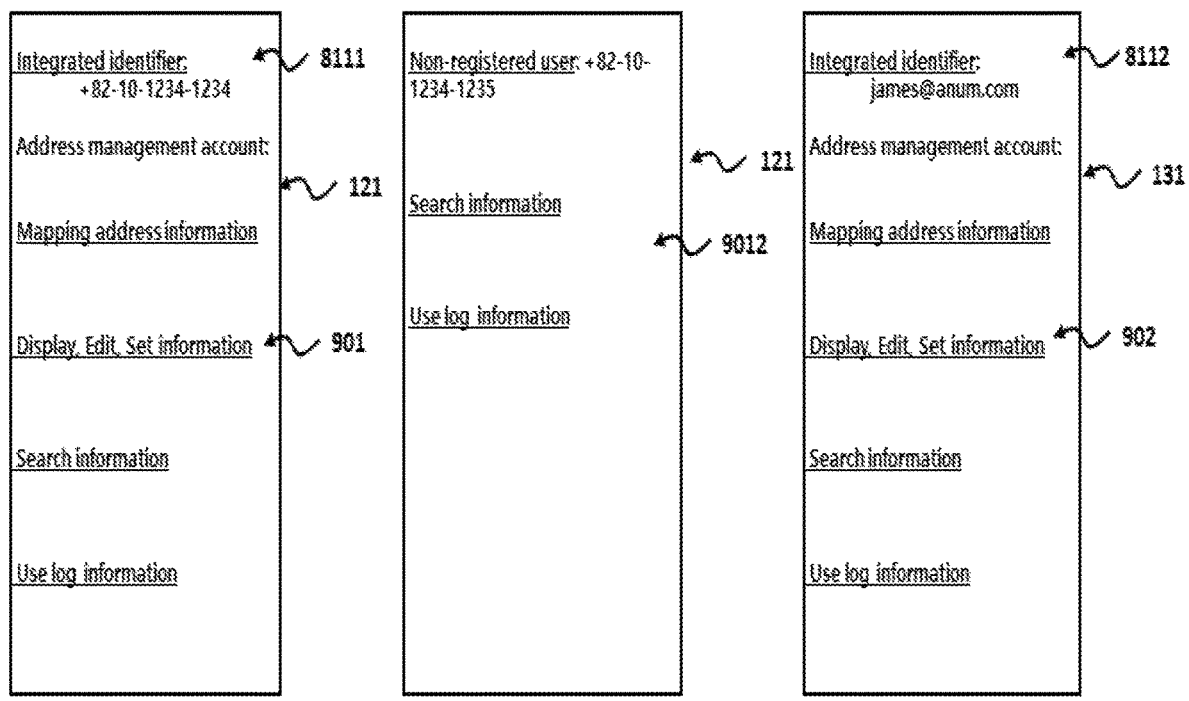
FIG. 9 is a view showing an example of the database (DB) configuration of an address mapping server according to the present invention.

FIG. 9 is a view showing an example of the basic configuration of a database of an address mapping server created according to information on the address management server of FIG. 8. Information on the address mapping server is controlled on the basis of information on the address management server, and all the information including the integrated identifier may be changed. According to the integrated identifiers registered in the address management server of FIG. 8, related addresses and information are transferred to and stored in an address mapping server of a corresponding identifier, and an integrated identifier, URI access menus mapped under the integrated identifier, and related information are displayed on the user terminal on the basis of information on the address mapping server. For example, if a wireless phone number 8111 and an e-mail address 8112 are registered in the integrated identifier registration 811 field of the address management server, an address mapping database 901 of the wireless phone number 8111 is configured in the address mapping server 121 in charge of the corresponding wireless phone number, and in addition, an address mapping database 902 of the e-mail address 8112 is configured in the address mapping server 131 in charge of the corresponding e-mail address 8112. In addition, search information and log information created by users may also be stored in the database, and search and log information of non-registered users may also be stored and managed in the address mapping servers in the form of a separate DB, respectively. For example, search and log information of non-registered users who have searched for addresses of wireless phone number mapping servers or who have used URI access menus under the integrated identifier of the wireless phone may also be stored and managed 9012. In addition, each of the address mapping servers possesses all the information on the terminals or accounts which should synchronize or update address mapping information. Meanwhile, all the phone numbers under a single country domain have a country number as the top identification code, regardless of whether a subscriber inputs a country number.

In a way the same as described above, an address mapping server using a homepage address or an SNS account as an integrated identifier may be configured.

The terminal 101 and the address mapping servers 121 to 123 and 131 to 133 according to an embodiment of the present invention have a synchronization process there between by a periodic or non-periodic request.

Figure 10:
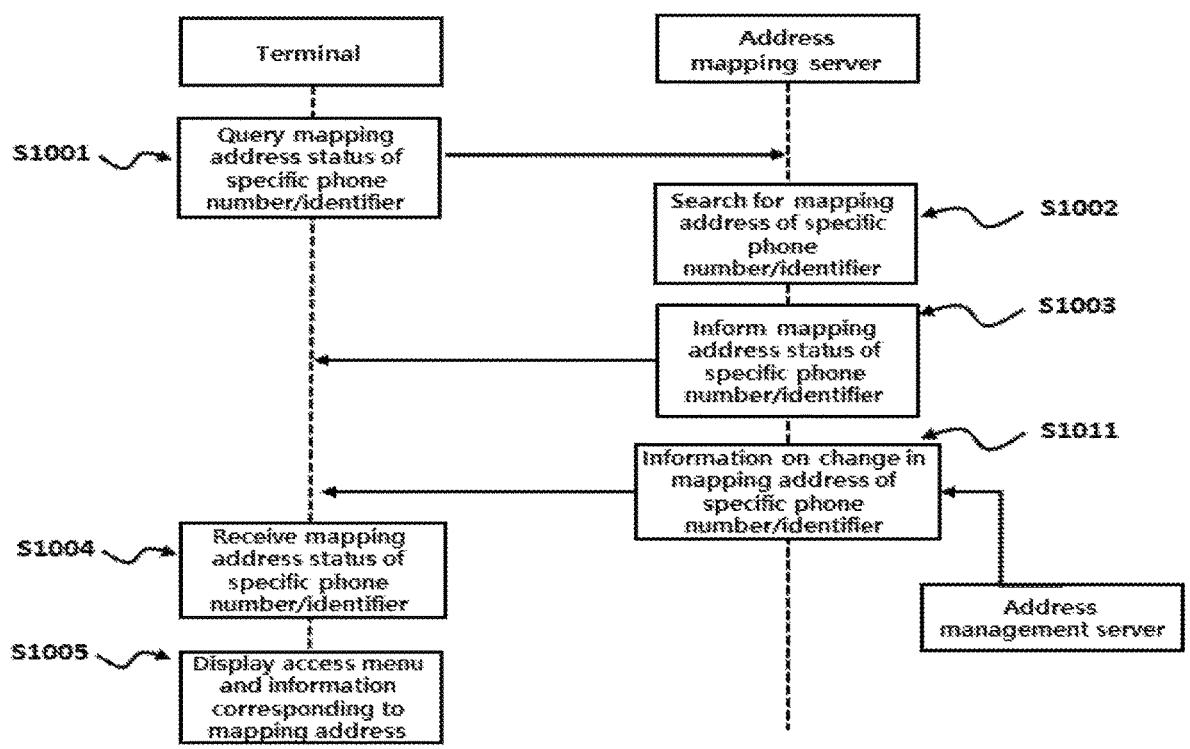
FIG. 10 is a sequence diagram illustrating an example process of synchronization between a terminal and an address mapping server according to the present invention.

FIG. 10 is a sequence diagram illustrating a synchronization method between a terminal and an address mapping server according to the present invention. All counterparts of a terminal user according to an embodiment cannot be a subscriber who registers his or her integrated identifier or URI in the address management server according to an embodiment. Although a user is a subscriber, he or she may not register or activate all the URIs that can be displayed on the screen, and display information or other attribute information and setting information may vary at any time. Accordingly, the terminal should display the integrated identifier that can be selected, together with URI access menus and information under the integrated identifier, after updating to the latest state.

If the terminal of the embodiment queries the address mapping server about the status of an address (URI) mapped to a specific phone number or identifier (S1001), the address mapping server searches for addresses mapped to the specific phone number or identifier (S1002) and informs the terminal of a mapping address status (address information, display information, attributes, setting information, etc.) (S1003). The terminal may receive the mapping address status (S1004), display only an access menu corresponding to the mapped address in an access menu display area of the contact point address book screen of the terminal or each integrated identifier use screen as text/icon (S1005), and mark, if access control is set, an activation indication according to whether or not the access menu is activated. Meanwhile, if the registrant changes information in the address management server, the information is also updated in the address mapping server, and the address mapping server informs the terminal of the changed information without a request of the terminal (S1011), and thus the information is updated and display in the latest state. The synchronization process as described above may be equally applied to contact information according to recent use records, contact information of a matching address book and the like, as well as a general address book.

Figure 11:
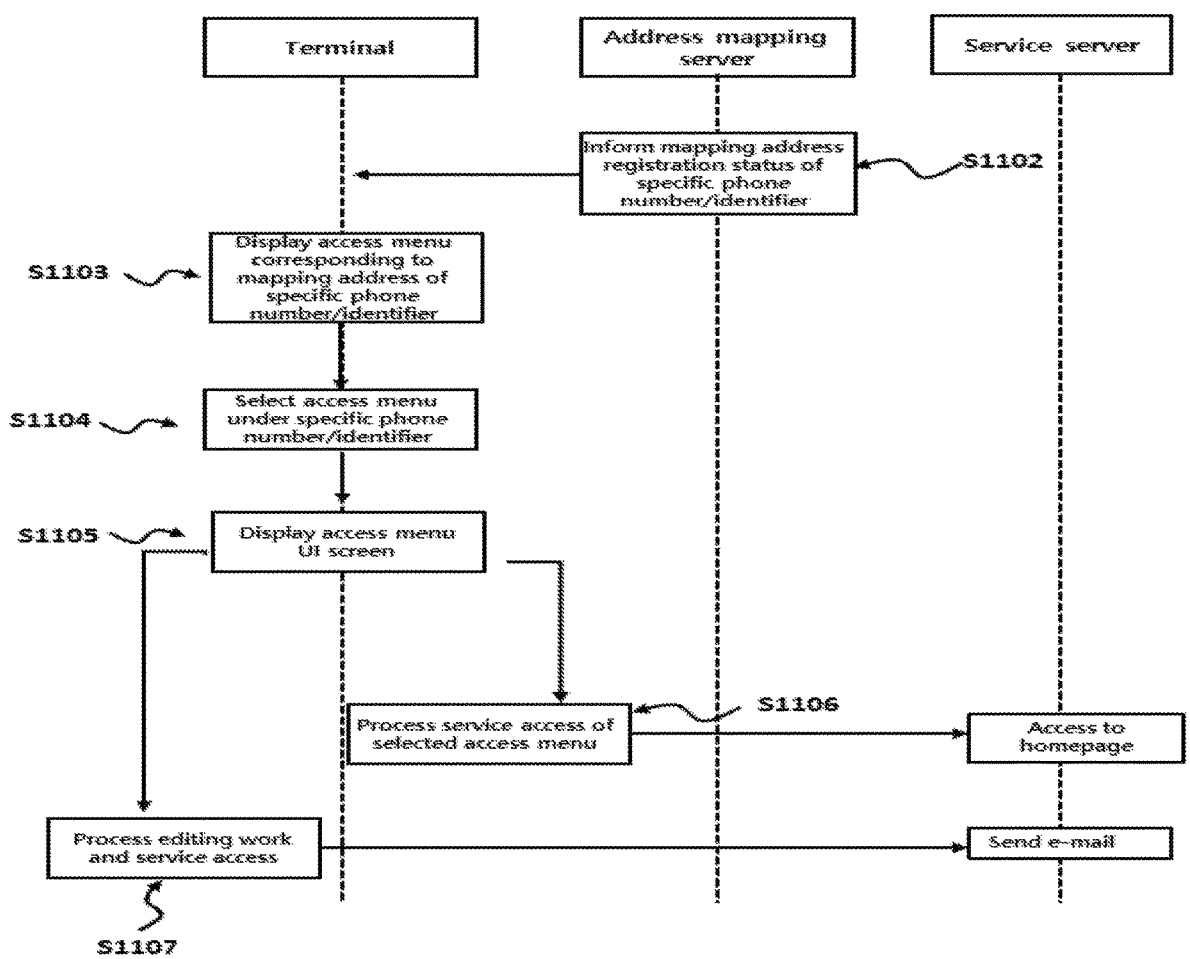
FIG. 11 is a sequence diagram illustrating an example of an integrated identification service method according to the present invention.

FIG. 11 is a sequence diagram illustrating a method of processing an integrated identification service according to an embodiment of the present invention.

First, as shown in FIG. 11, the terminal receives a specific phone number or identifier and an address registration status (basic information, integrated identifier information, URI information and display information) mapped under the phone number or the identifier from the address mapping server (S1102), and the terminal displays URI access menus corresponding to each address (URI) mapped to the specific phone number or identifier on the UI of a corresponding phone number/identifier supporting display unit (e.g., a phone call related screen in the case of a phone call or an e-mail screen in the case of an e-mail) of the terminal (S1103). If the user selects a desired access menu from the displayed URI access menus (S1104), a user interface (UI) corresponding to the access menu is opened (S1105), and in the case of an access menu like a homepage access, the service access is immediately processed (S1106). Then, in a case like an e-mail where an editing work is needed, an e-mail window is opened, and a service such as transmission or the like is processed after an editing work is processed on the same screen (S1107). The address displayed on the address window of a service user's screen is displayed in a state of exposing the whole address of the counterpart or in a state of masking the address (e.g., Gildong Hong/kilxxxx@xxxx.com) except the minimum information for identifying the counterpart, according to setting.

When a specific URI access menu is selected at the display unit, it may be selected in a method of touching or clicking, and when it is difficult to use a touching method like when the user is driving, voice recognition may be used. For example, if the user calls a geographical address (map) access menu by voice, together with a name or a phone number of a specific counterpart (e.g., "Connect to the map address of Gildong Hong" or "Connect to the map address of 010-1234-5678"), the geographical address of a corresponding counterpart is immediately displayed on the UI through the method like the signal processing step shown in FIG. 11, and subsequence services such as navigation and the like can be easily processed.

Figure 12:
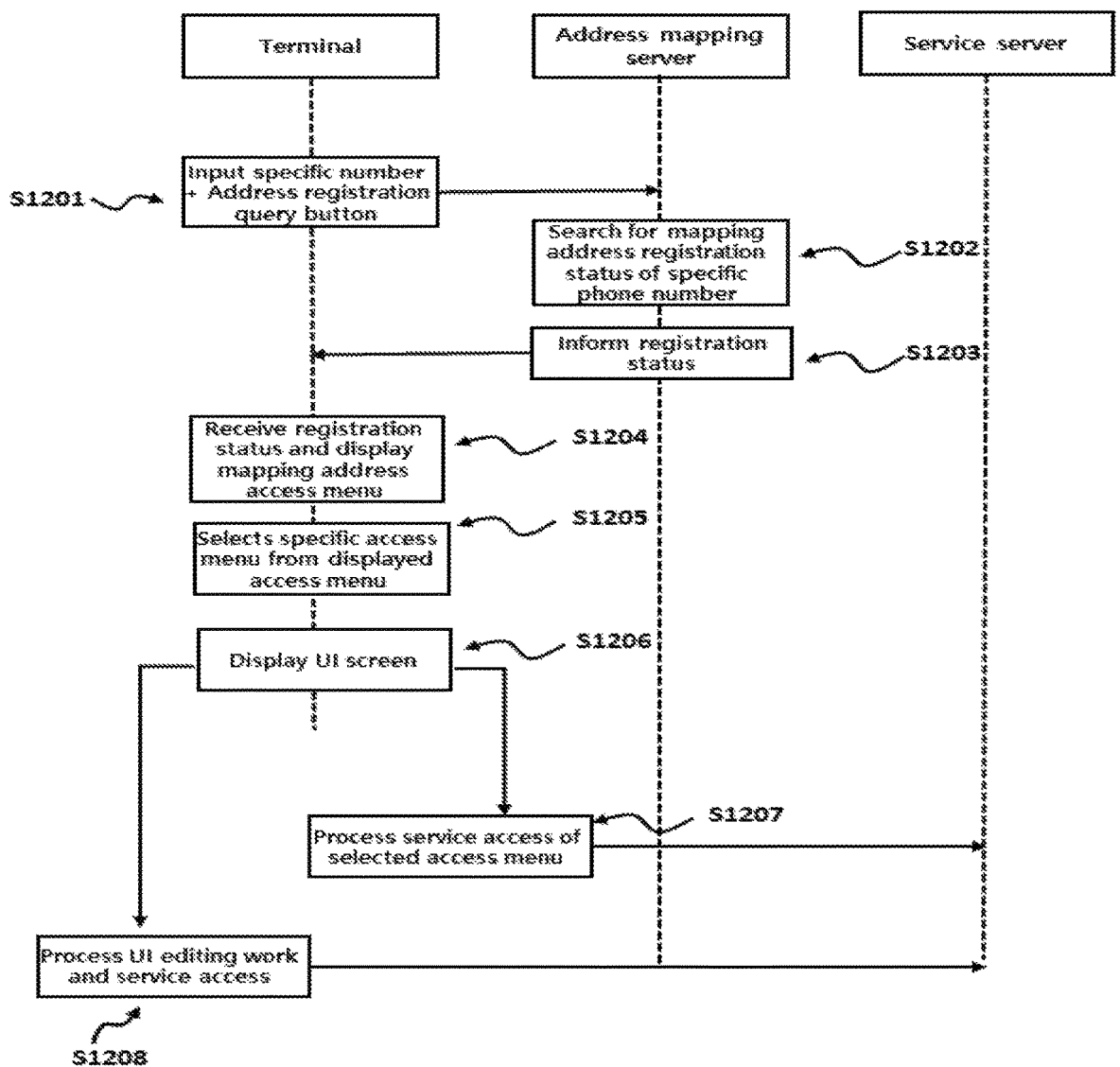
FIG. 12 is a sequence diagram illustrating an example of a process of handling a service on a call preparation screen (or a dial pad screen) of a terminal according to the present invention.

FIG. 12 is a sequence diagram illustrating an example of a method of processing a service on a call preparation screen (or a dial pad screen) of a terminal according to an embodiment of the present invention.

The user may query a selectable access menu from the address mapping server before initiating a service by selecting an access menu query button after inputting a specific phone number. If the user marks the end of input or presses a query icon separately displayed on the call preparation screen (or dial pad screen) after inputting a specific phone number on the call preparation screen (or dial pad screen) (S1201), a query request signal is transferred to the address mapping server. The address mapping server searches for a mapping address status registered under the requested phone number (S1202) and informs the terminal of the registration status (S1203). The terminal receives the registration status and displays only access menus corresponding to the mapped address (URI) in an access menu area (S1204). If the user selects a specific access menu item from the displayed access menu (S1205), an application operating under a call preparation screen of the terminal may call and display a corresponding UI of the selected access menu item (S1206) and process subsequent services (S1207 and S1208).

Figure 13:
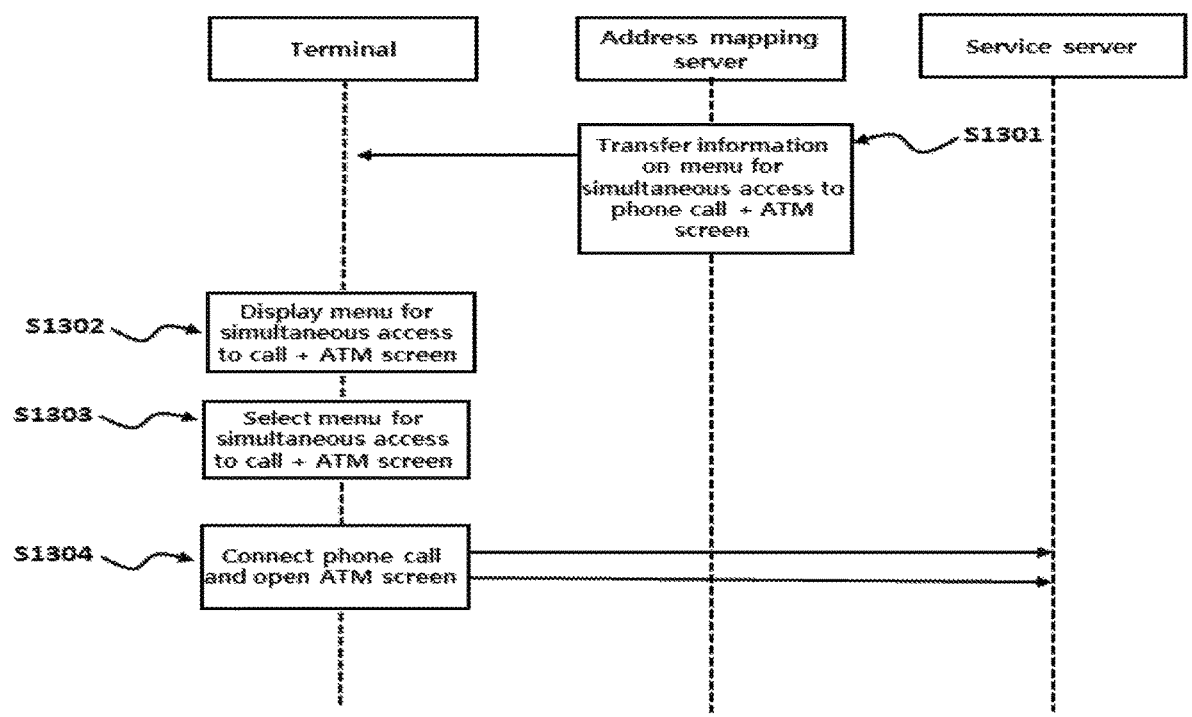
FIG. 13 is a sequence diagram illustrating an example of a method of simultaneously processing a plurality of URI access menus in a terminal according to the present invention.

FIG. 13 is a sequence diagram illustrating an example of a method of simultaneously processing a plurality of services in a terminal according to the present invention. Service combinations such as various wire and wireless composite services, voice/data integration services, CTI services and the like may be created by utilizing the same function.

For example, if a receiver sets a menu for simultaneously accessing a phone call and an automated teller machine (ATM) in the address management server, a call/ATM simultaneous access menu is transferred to the terminal through the address mapping server (S1301) and displayed on the terminal (S1302). If the receiver selects the call/ATM simultaneous access menu on the call preparation screen or the contact point address book screen of the terminal (S1303), the terminal requests a general call connection and opens an ATM menu screen at the same time (S1304), and the user may access the ATM menu screen and use the service together with voice guidance. If this process is used, a hacking-free voice-guided payment/money transfer service, a voice-guided customer center screen or the like may be provided through a multi-channel method, and users may use the service very conveniently. An icon for selecting the simultaneous access menu may be displayed in a composite form of individual icons (e.g., call/banking, ☎/₠) or may be implemented by selection of a multi-service access menu shaped in a single icon or a sequential access menu. In the method as described above, the user may simultaneously use multiple services as is needed for a business with a counterpart.

Figure 14:
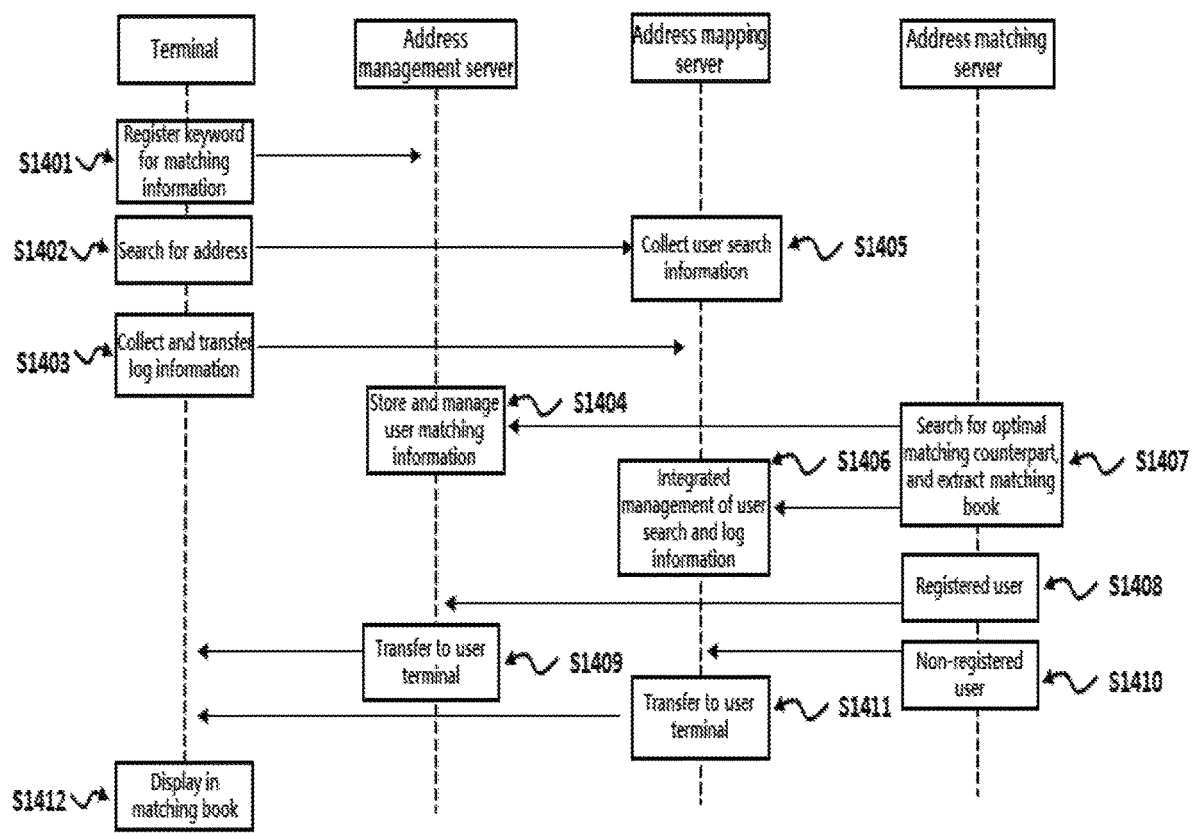
FIG. 14 is a sequence diagram illustrating an example of a method of extracting an optimal matching address list and displaying the matching address list in a matching book (matching address book) of a terminal, by an address matching server according to the present invention.

FIG. 14 is a sequence diagram illustrating a process of displaying matching addresses in a matching book (matching address book) of a terminal. Basic information for optimal matching is attribute information and keywords registered in the address management server by a user (S1401), information on addresses searched from the address mapping server by the user (S1402), and log information of a URI access menu selected from the display unit of the terminal and used by the user (S1403). A search/matching engine of the address matching server extracts an optimal matching address list(S1407) referring to user matching information stored and managed by the address management server (S1404) and user's search information and log information collected and managed by the address mapping server (steps S1405 and S1406). Next, in the case of a registered user (S1408), the matching addresses are displayed in the matching book of the account registrant terminal (S1412) by way of the address management server (S1409), and in the case of a non-registered user (S1410), the matching addresses are transferred (S1411) to the terminal of the user stored in the address mapping server as log information and displayed in the matching book (S1412). The matching process like this is only an example, and solutions for more efficient and correct matching may be used on the basis of the present invention.

The address servers according to the present invention (the address management server and the address mapping server) are general address database servers which do not have the structure of an Internet domain server, do not need a complicated address conversion and extraction process, use a phone number or an identifier as a key value, and do not require a specific layer structure as far as it is possible to find out an address mapping server in which information on an integrated identifier requested by a specific terminal exists. However, in the case of the address mapping server, generally, it can be efficient to have a layer structure and a routing system corresponding in parallel to the subscriber management server of an existing phone number or service identifier.

Figure 15:
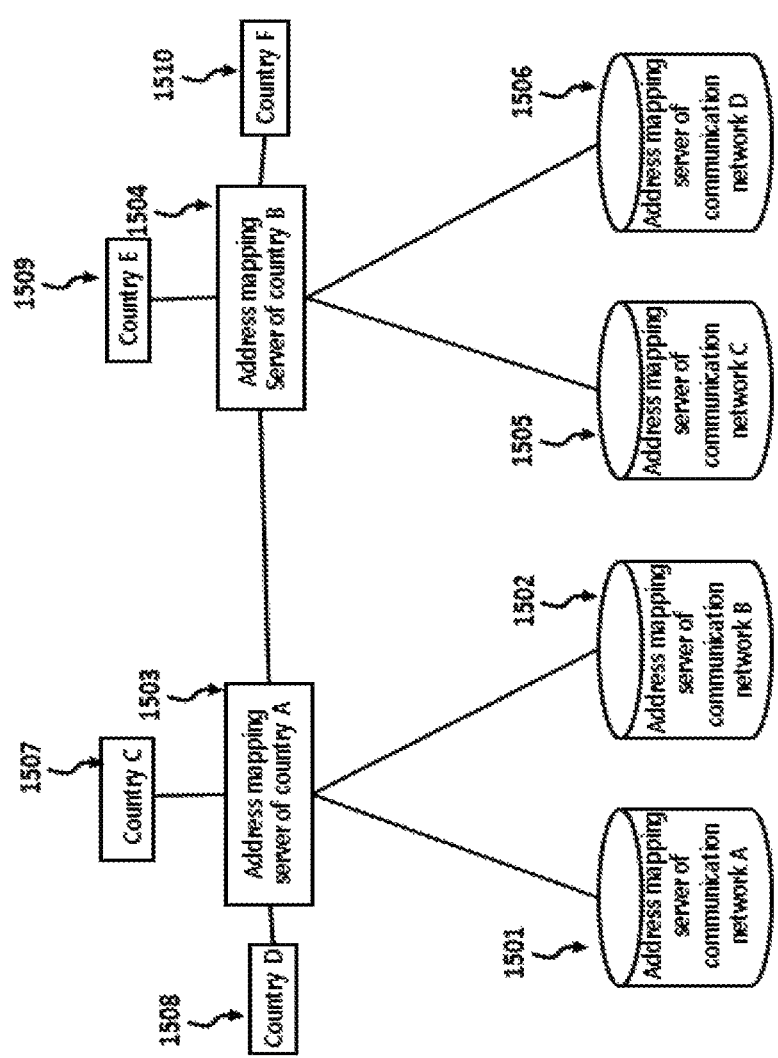
FIG. 15 is a view showing an example of a layer structure of a phone number address mapping server.

FIG. 15 is a view showing an example of a layer structure of an address mapping server using a phone number as an integrated identifier.

Since the address mapping server using a phone number as an integrated identifier is closely related to the phone number, it may have a layer structure the same as the layer structure of a network which processes the phone number. Communication networks managing their own phone numbers have an address mapping server corresponding to their hierarchies. For example, communication network A in a country is provided with an address mapping server 1501 of communication network A, and an address mapping server 1502 of communication network B of the same communication network level may exist. A network of a higher level exists to connect communication networks of the same communication network level, and a top level exists in a single country. To this end, an address mapping sever corresponding to each higher level exists, and an address mapping server 1503 of country A as shown in the example exists in a country. The address mapping servers of each country, such as address mapping servers of country B 1504, country C 1507, country D 1508, country E 1509 and country F 1510, are interconnected with each other as shown in the figure and may be globally interconnected under a layer structure like those of the address mapping server 1505 of communication network C and the address mapping server 1506 of communication network D belonging to a lower level of country B shown in the figure. An individual address mapping server may be a simple call routing server or a server simultaneously performing management of call routing and an address mapping database according to the function performed at each level. In addition, since integration and distribution of server functions for efficient management and stable service process of the address mapping server (e.g., split of the call routing server and the data management server), adoption of block chain techniques or the like for protection of data, and the like can be implemented by adopting an optimal method through an open technique according to an environment for implementing a service and a form of using the service, detailed description thereof will be omitted herein. In addition, since the role of the address mapping server of the embodiment is not processing a general service call, but transferring registered address status mapped under a specific communication number or service identifier, the address mapping server may be designed in a simple structure different from the hierarchy of a general communication network or a service identifier, not a distributed layer structure of a complicated hierarchy, as long as simultaneous call processing loads can be endured.

Although the present invention has been described focusing on the embodiments, this is only an example and does not limit the present invention, and it is to be appreciated that those skilled in the art can make various modifications and applications not shown above without departing from the fundamental characteristics of the embodiments. For example, if basic URI access menus are displayed and marked as inactivated at the same time even under a phone number of a user who does not subscribe the integrated identification service of the present invention, this may be helpful in improving recognition of a user on the integrated identification service and inducing non-members to subscribe the integrated identification service. In addition, information security or the like may be added to the steps of the service processing method if needed for a special purpose. For example, information excluding only the practical address information of the address mapping server is sent to the terminal and displayed as an access menu, and an address corresponding to a corresponding access menu may be sent to the terminal after going through a step of extracting an address corresponding to the access menu from the address mapping server only when the processing is actually performed. In addition, the address management servers of the present invention may provide an open API that can be associated with external servers, and accordingly, various service associations are possible. That is, each constitutional component specifically appearing in the service embodiments may be diversely modified and embodied according to a practical application environment. In addition, differences related to these modifications and applications should be interpreted as being included in the scope of the present invention defined by the appended claims.

The invention claimed is:

1. An integrated identifier management system comprising:
an address mapping server, wherein the address mapping server includes (i) integrated identifier information, (ii) mapping address (URI) information, and (iii) display information, which are set and stored by a subscriber, wherein the mapping address (URI) information and the display information are coupled with the integrated identifier information, wherein, upon receipt of an information request for an integrated identifier from a given user interface (UI) of a user terminal, the address mapping server transmits the integrated identifier information, the mapping address (URI) information and the display information to the user terminal so that the user terminal displays on the given user interface (UI) URI access menus corresponding to the integrated identifier information, the mapping address (URI) information, and the display information, wherein the display information is set by the subscriber and includes information by which the user terminal displays the URI access menus differently according to subscriber's counterparts, wherein the integrated identifier is one of a phone number, an e-mail address, an SNS account, and a combination thereof, wherein the mapping address (URI) information includes one or more URIs (addresses) mapped with the integrated identifier, wherein, when (i) the integrated identifier is the phone number and (ii) the given user interface (UI) of the user terminal is a telephone keypad, the URI access menus are displayed on the telephone keypad of the user terminal or an extended UI of the keypad, along with original function menus for the phone number, wherein, when (i) the integrated identifier is the phone number and (ii) the given user interface (UI) of the user terminal is a telephone contact list user interface, the URI access menus are displayed on the telephone contact list user interface of the user terminal, along with the original function menus for the phone number, wherein, when (i) the integrated identifier is the e-mail address and (ii) the given user interface (UI) of the user terminal is an e-mail user interface, the URI access menus are displayed on the e-mail user interface of the user terminal, along with original function menus for the e-mail address, wherein, when (i) the integrated identifier is the SNS account and (ii) the given user interface (UI) of the user terminal is a SNS user interface, the URI access menus are displayed on the SNS user interface of the user terminal, along with original function menus for the SNS.

2. The system according to claim 1, further comprising:
an address management server,
wherein the address mapping server is located at a hierarchically lower layer than the address management server, wherein the address management server includes subscriber basic information and the integrated identifier information coupled with the subscriber basic information, the mapping address (URI) information, the display information, and matching information, wherein, when the integrated identifier information included in the address management server changes, the integrated identifier information included in the address mapping server, the mapping address (URI) information and the display information coupled with the integrated identifier are updated accordingly.

3. The system according to claim 2, further comprising:
an address matching server,
wherein the address matching server extracts and displays on a given user interface of a terminal a matching counterpart address list on the basis of matching information of the address management server and search and log, information of the address mapping server,
wherein the given user interface is implemented in the form of counterpart address list.

4. The system according to claim 1,
wherein the address mapping server transmits the integrated identifier information, the mapping address (URI) information and the display information to the user terminal via wired wireless network,
wherein the user terminal includes a smart phone, a PC, a tablet PC, an Artificial Intelligence (AI) speaker, a kiosk, or a transportation vehicle.

5. The system according to claim 1,
wherein the given user interface (UI) of the user terminal is implemented by an integrated identifier service application,
wherein the integrated identifier service application displays on the given user interface (UI) the URI access menus corresponding to the integrated identifier information, the mapping address (URI) information and the display information provided from the address mapping server, and
wherein, in response to selection of one of the URI access menus, the integrated identifier service application connects the user terminal to a service user interface or a service corresponding to the selected URI access menu.

6. The system according to claim 1,
wherein the URI access menu includes one of access menus corresponding to a phone number, a facsimile number, a web page address, an e-mail address, a banking account, a messenger service account, a social media service account, an image media channel, a vehicle/thing and a camera, a geographical address, or a combination thereof.

7. The system according to claim 1,
wherein the URI access menus are activated in response to a voice recognition command.

* * * * *